(12) United States Patent
Cho (10) Patent No.: US 10,458,665 B2
(45) Date of Patent: Oct. 29, 2019

(54) PASSIVE LIQUID COLLECTING DEVICE

(71) Applicant: HAMILTON SUNDSTRAND CORPORATION, Charlotte, NC (US)

(72) Inventor: Wei-Lin Cho, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 304 days.

(21) Appl. No.: 15/262,096

(22) Filed: Sep. 12, 2016

(65) Prior Publication Data

US 2018/0073752 A1    Mar. 15, 2018

(51) Int. Cl.
| | |
|---|---|
| *F25B 43/00* | (2006.01) |
| *F24F 5/00* | (2006.01) |
| *F16T 1/38* | (2006.01) |
| *F28C 3/00* | (2006.01) |
| *F25B 23/00* | (2006.01) |
| *F25B 49/00* | (2006.01) |

(52) U.S. Cl.
CPC ............. *F24F 5/0035* (2013.01); *F16T 1/38* (2013.01); *F25B 23/006* (2013.01); *F25B 43/003* (2013.01); *F25B 43/006* (2013.01); *F25B 49/00* (2013.01); *F28C 3/005* (2013.01); *F25B 2600/13* (2013.01); *F25B 2700/2113* (2013.01); *Y02B 30/745* (2013.01)

(58) Field of Classification Search
CPC ..... F24F 5/0035; F25B 23/006; F25B 43/003; F25B 43/006; F25B 49/00; F25B 2600/13; F25B 2700/2113; F25B 2400/23; B64G 1/50; B64G 1/506; B64G 1/503; F28D 15/046; F28D 15/0266; F28D 15/043

USPC ......................................................... 62/310
See application file for complete search history.

(56) References Cited

U.S. PATENT DOCUMENTS

| | | | |
|---|---|---|---|
| 3,965,334 A | * | 6/1976 | Asselman ........... F28D 15/0233 |
| | | | 219/399 |
| 3,984,051 A | | 10/1976 | Labbe et al. |
| 4,613,438 A | | 9/1986 | DeGraffenreid |
| 4,749,485 A | | 6/1988 | DeGraffenreid |
| 4,770,238 A | | 9/1988 | Owen |
| 4,869,313 A | * | 9/1989 | Fredley .................... B64G 1/50 |
| | | | 165/41 |
| 4,957,157 A | | 9/1990 | Dowdy et al. |
| 5,303,768 A | | 4/1994 | Alario et al. |
| 6,052,992 A | | 4/2000 | Eroshenko |
| 6,615,609 B2 | | 9/2003 | Kawasaki et al. |
| 6,990,816 B1 | | 1/2006 | Zuo et al. |

(Continued)

FOREIGN PATENT DOCUMENTS

| | | |
|---|---|---|
| CN | 102514733 | 6/2012 |
| EP | 2584288 A2 | 4/2013 |
| RU | 2117891 | 8/1998 |

OTHER PUBLICATIONS

European Search Report for European Application No. 17189990.9 dated Nov. 21, 2017.

*Primary Examiner* — Joseph F Trpisovsky
(74) *Attorney, Agent, or Firm* — Carlson, Gaskey & Olds, P.C.

(57) ABSTRACT

A passive liquid collecting device has a reservoir with an outlet and one or more rigid structures within the reservoir. The rigid structures are configured to collect a liquid and direct the liquid to the outlet. Porous capillary media are supported by the rigid structures. A thermal control loop is also disclosed.

17 Claims, 8 Drawing Sheets

(56) References Cited

U.S. PATENT DOCUMENTS

| | | |
|---|---|---|
| 9,103,602 B2 | 8/2015 | Kroliczek et al. |
| 9,108,144 B2 | 8/2015 | Behruzi et al. |
| 2007/0157808 A1 | 7/2007 | Wagner et al. |

* cited by examiner

PASSIVE LIQUID COLLECTING DEVICE

BACKGROUND

This application relates to a passive liquid collecting device.

In microgravity and zero gravity environments, fluids tend to distribute throughout the reservoir storing the fluid. Some of the fluid, such as liquid, will attach to a wall of the reservoir, and the rest of the fluid will float throughout a cavity defined by the reservoir. The distribution of fluids attached to the reservoir wall and floating in the cavity can raise challenges when drawing a liquid phase of the fluid from the reservoir.

Two phase chiller systems, sometimes called thermal control loops, frequently have accumulators which collect both liquid and vapor refrigerant. The two phase chiller systems may be damaged or operate less efficiently if they draw a mixture of liquid and vapor from the accumulator instead of drawing liquid.

A known solution for separating liquid from vapor is a structure that operates through capillary material. The capillary material collects liquid, but not vapor. The capillary material can be arranged within a reservoir to gather dispersed liquid and channel it to a desired location.

Capillary materials function in large part by porosity. The use of the material requires certain design considerations to guide liquid to a specific location instead of simply collecting and retaining the liquid. One known approach to guide the liquid is to construct the capillary material such that pores decrease in size as they approach the desired collection location. Systems operating on this principle can be difficult to design and manufacture such that they work efficiently.

SUMMARY

A passive liquid collecting device has a reservoir with an outlet and one or more rigid structures within the reservoir. The rigid structures are configured to collect a liquid and direct the liquid to the outlet. Porous capillary media is supported by the rigid structures. A thermal control loop is also disclosed.

These and other features may be best understood from the following drawings and specification.

DETAILED DESCRIPTION

Figure 1:
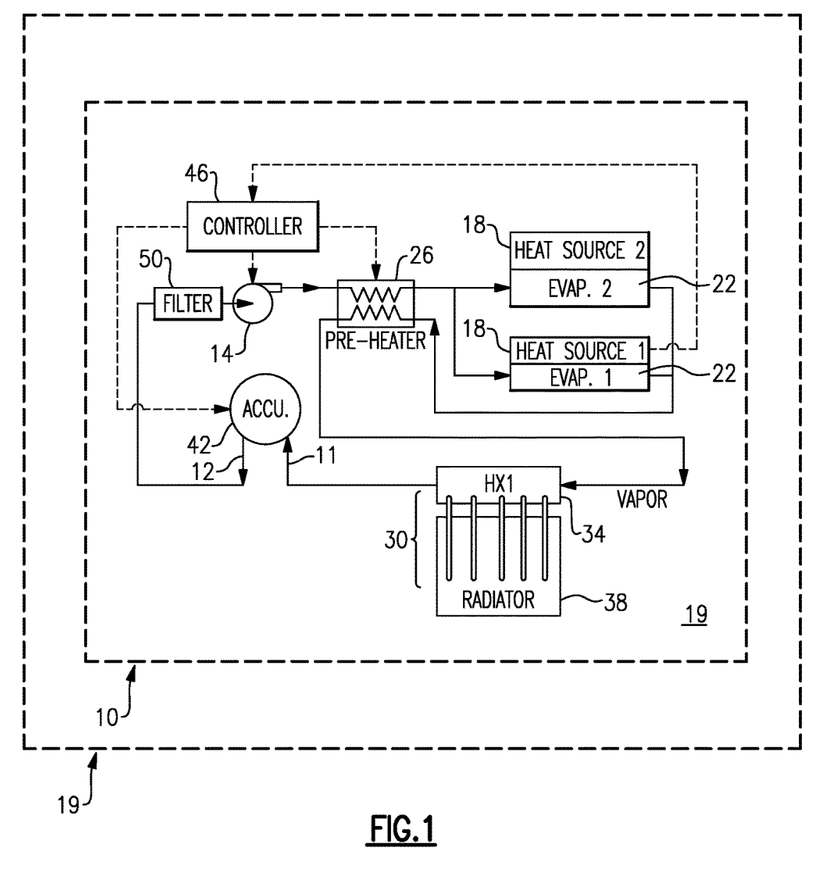
FIG. 1 schematically represents a thermal control loop.

FIG. 1 is a schematic representation of a thermal control loop 10, which may also be referred to as a two phase chiller system. The thermal control loop 10 circulates a refrigerant to remove heat from objects or systems adjacent the thermal control loop 10. In the illustrated embodiment, the thermal control loop 10 is driven by a pump 14, but it should be understood that thermal control loops 10 operating without a pump 14 may also benefit from this disclosure. In the illustrated embodiment, the operating capacity of the pump 14 is adjusted by a controller 46 that monitors conditions around the thermal control loop 10. The refrigerant in the thermal control loop 10 cools one or more heat sources 18. In one embodiment, the heat sources 18 are electrical components in a spacecraft 19 that may sometimes operate in a microgravity or zero gravity environment.

The heat sources 18 are cooled with evaporators 22. The evaporators 22 cool the heat sources 18 by liquid refrigerant. In evaporators 22 the refrigerant undergoes a phase change from a liquid to a vapor. Some heat from the vapor may be communicated to liquid refrigerant earlier in the loop through a preheater or recuperator 26. The preheater 26 exchanges heat from refrigerant in vapor form exiting the evaporators 22 to refrigerant in liquid form upstream of the evaporators 22. The preheater 26 contributes to efficient operation of the thermal control loop 10 by bringing the liquid refrigerant close to an evaporating temperature before it reaches the evaporators 22. The refrigerant in vapor form that exited the evaporators 22 is converted back into liquid by a condenser 30 downstream from the evaporators 22. In one embodiment, the condenser 30 comprises a heat exchanger 34 and a radiator 38 which, respectively, take heat from the refrigerant in vapor form and convey the heat out of the thermal control loop 10.

During steady state operation of the thermal control loop 10, very little refrigerant in vapor form will exit the condenser 30. During transient conditions when a thermal load on the evaporators 22 is increasing, such as caused by a sudden increase in a temperature of the heat sources 18, more refrigerant in vaporous form will remain in vaporous after passing through the condenser 30. The increase in refrigerant in vaporous form downstream of the condenser 30 occurs until a new steady state condition is reached in the thermal control loop 10. The new steady state is reached by the controller 46 monitoring the temperature and pressure of an accumulator 42 and the preheater 26 and adjusting a flow of the refrigerant through the thermal control loop 10 with the pump 14.

In the illustrated embodiment, the thermal control loop 10 includes an accumulator 42 downstream of the condenser 30 for separating liquid refrigerant from vaporous refrigerant that passed through the condenser 30 without condensing into liquid form. After passing the condenser 30, the refrigerant enters the accumulator 42 through an entry passage 11. As detailed below, the accumulator 42 collects refrigerant in liquid form to exit through an exit passage 12. Most of the refrigerant that exits through the exit passage 12, as measured by mass flow rate, is in liquid form.

The thermal control loop 10 may contain a filter 50 as well for maintaining quality of the liquid refrigerant.

Figure 2A:
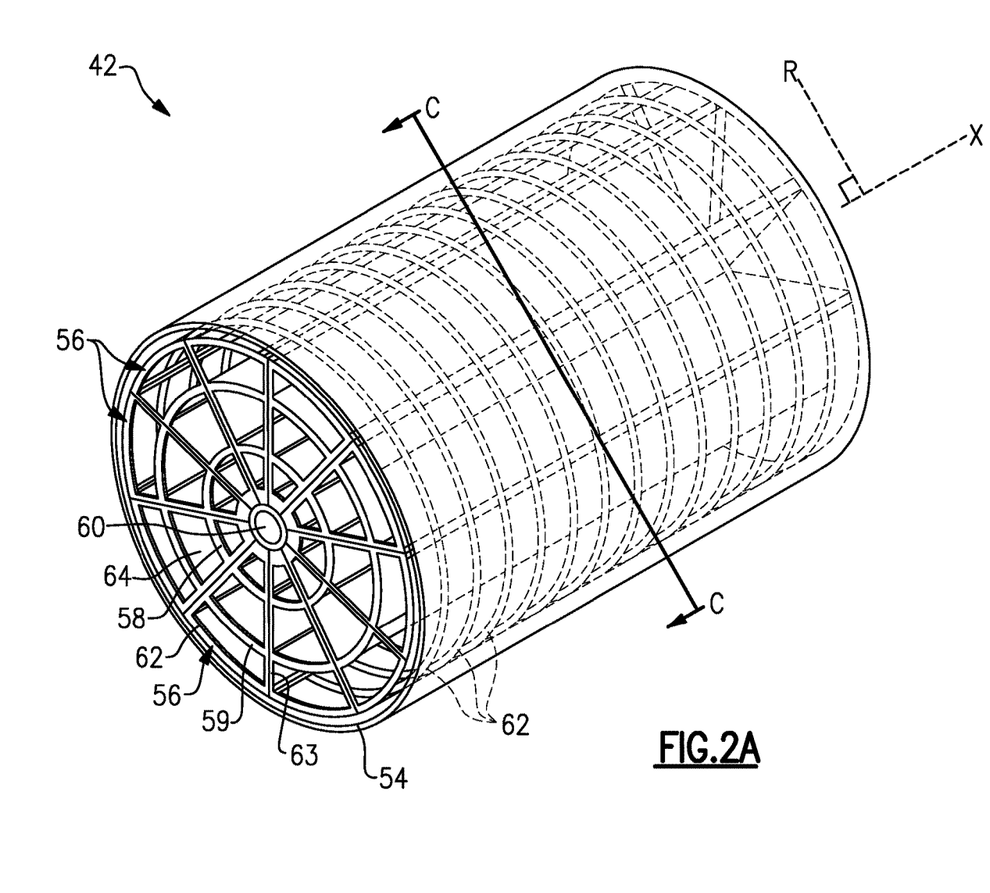
FIG. 2A illustrates an accumulator.

FIG. 2A depicts an accumulator 42. A volume of the accumulator 42 is defined by walls of a reservoir 54. Within the reservoir 54 are a group of rigid structures 56 arranged circumferentially around an outlet tube 60. During operation of the thermal control loop 10, liquid may flow continuously from the outlet tube 60, which is made of a porous material. The porous material of the outlet tube 60 contributes to a flow of liquid in the reservoir 54. In one embodiment, the rigid structures 56 are constructed from a material chosen to not be reactive with the refrigerant used in the thermal control loop 10.

The reservoir 54 shown in this embodiment has a cylindrical shape, with an axial component extending along an axis X, and a radial component R extending outward from the axis X. The group of rigid structures 56 in this embodiment is arranged to also define a cylindrical shape. In the illustrated embodiment, the group of rigid structures 56 is arranged across 360° of the reservoir 54. The rigid structures 56 extends along at least a majority of a length of the reservoir 54 along the X axis. Each rigid structure 56 also has legs 63 extending from a point where the rigid structure 56 contacts the outlet tube 60 to an outermost rib 62. In the illustrated embodiment, the legs 63 extend along a radial direction and extends across at least a majority of a radius of a circular section of the reservoir 54. Because of the axial and radial extension of the rigid structures 56, the cylindrical shape defined by the group of rigid structures 56 in this embodiment extends throughout a significant portion of the reservoir 54. A porous capillary media 64 is wrapped around the rigid structure 56.

It should be understood that, although the reservoir 54 and arrangement of the rigid structures 56 shown in this embodiment are both cylindrical, the reservoir 54 and arrangement of the rigid structures 56 could be of any shape suitable for facilitating liquid travel toward the outlet tube 60 without departing from the scope of this disclosure. As an example, the reservoir 54 and the volume defined by the extremities of the rigid structures 56 could define a shape that is rectangular in section.

Figure 2B:
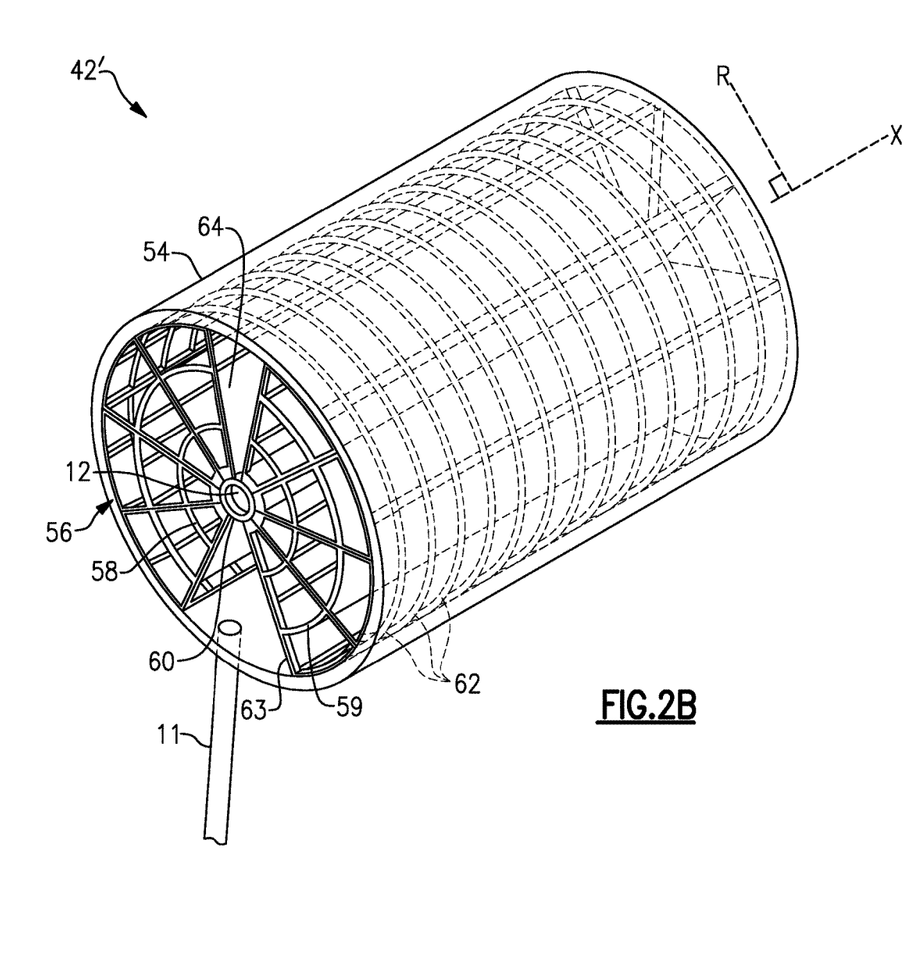
FIG. 2B illustrates an accumulator according to another embodiment.

An accumulator 42' according to another embodiment is shown in FIG. 2B. The accumulator 42' is similar to the accumulator 42 except where described below or shown in the figures. The accumulator 42' includes fewer rigid structures 56, providing space for refrigerant to enter the accumulator 42'. As shown, inlet 11 may enter into one of the empty spaces. In the illustrated embodiment, two rigid structures 56 are removed across from each other, but it should be understood that other groups of one or more rigid structures 56 removed from the accumulator 42' instead also come within the scope of the disclosure.

Figure 2C:
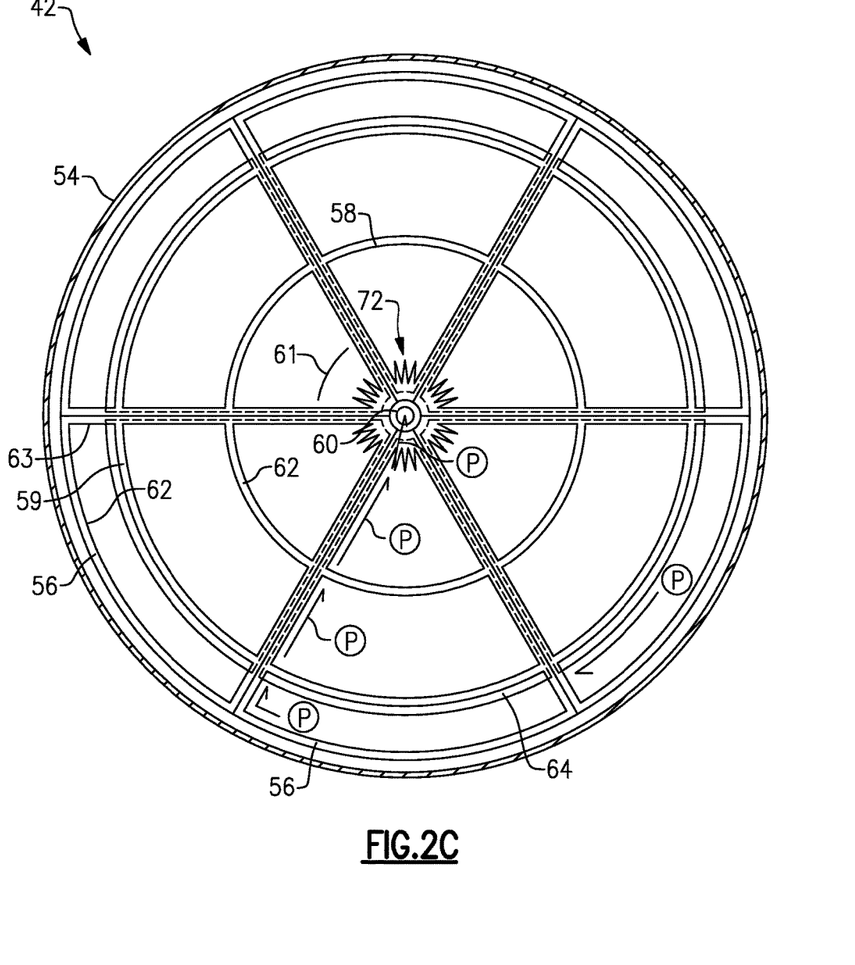
FIG. 2C is a cross-sectional view of the accumulator along line C-C of FIG. 2A.

FIG. 2C shows a cross-section of the accumulator 42 taken along line C-C of FIG. 2A. Flow paths for example droplets or particles P of liquid refrigerant show how liquid refrigerant may flow from a radially outer area of the reservoir 54 to the outlet tube 60. The rigid structures 56 have features which will be discussed further below that facilitate liquid movement across the legs 63. The legs 62, ribs 58, 59, 62, and porous capillary media 64 cooperate to cause liquid to disperse across the rigid structures 56. However, because of flow from the outlet tube 60 and liquid collecting features such as corner grooves 72 of the rigid structures 56 near the outlet tube 60 that will be detailed below, overall liquid travel will generally go from radially outer portions of the rigid structures 56 to radially inner portions of the rigid structures 56.

As shown, particles P of liquid refrigerant floating in the reservoir 54 may contact the rigid structure 56. If the particle P contacts the rigid structure, it will disperse across the legs 63 or ribs 58, 59, 62. If the particle P contacts porous capillary media 64, it will disperse throughout the porous capillary media 64. In either case, even dispersion of liquid across the rigid structures 56 and porous capillary media 64 will eventually cause liquid refrigerant to be collected in corner grooves 72, which are in fluid communication with the outlet tube 60. Because the porous capillary media 64 wrap around the rigid structures 56, parts of the porous capillary media 64 are disposed between the rigid structures 56 and the outlet tube 60, putting them in direct contact with the outlet tube 60. Because of the direct contact between the porous capillary media 64 and the outlet tube 60, liquid refrigerant may also be communicated to the outlet tube 60 directly through the porous capillary media 64.

Particles P that contact a structure 56 or porous capillary media 64 between the legs 63 will flow towards a leg 63. Once at a leg 63, the liquid moves radially inwardly along a leg 63 to the outlet tube 60.

Figure 3:
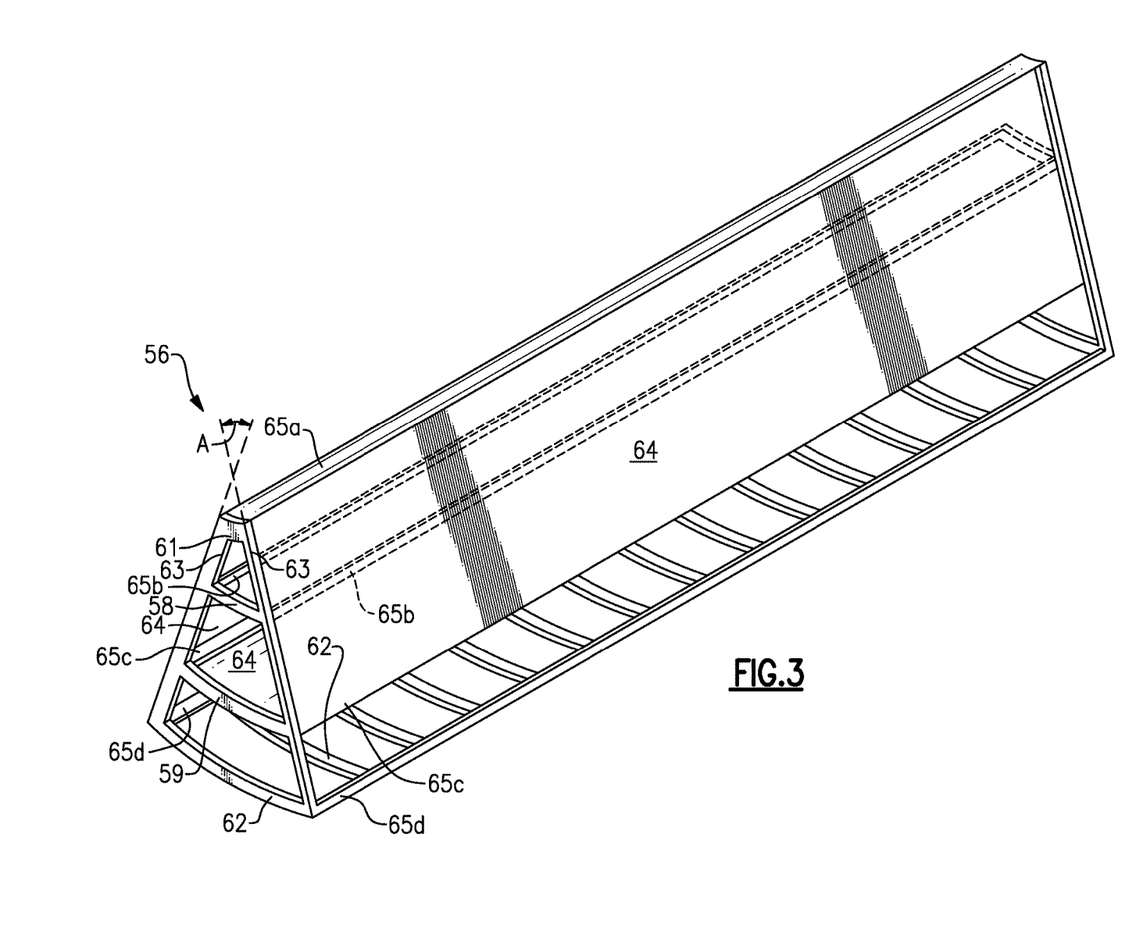
FIG. 3 illustrates a rigid structure suspending porous capillary media.
Figure 4A:
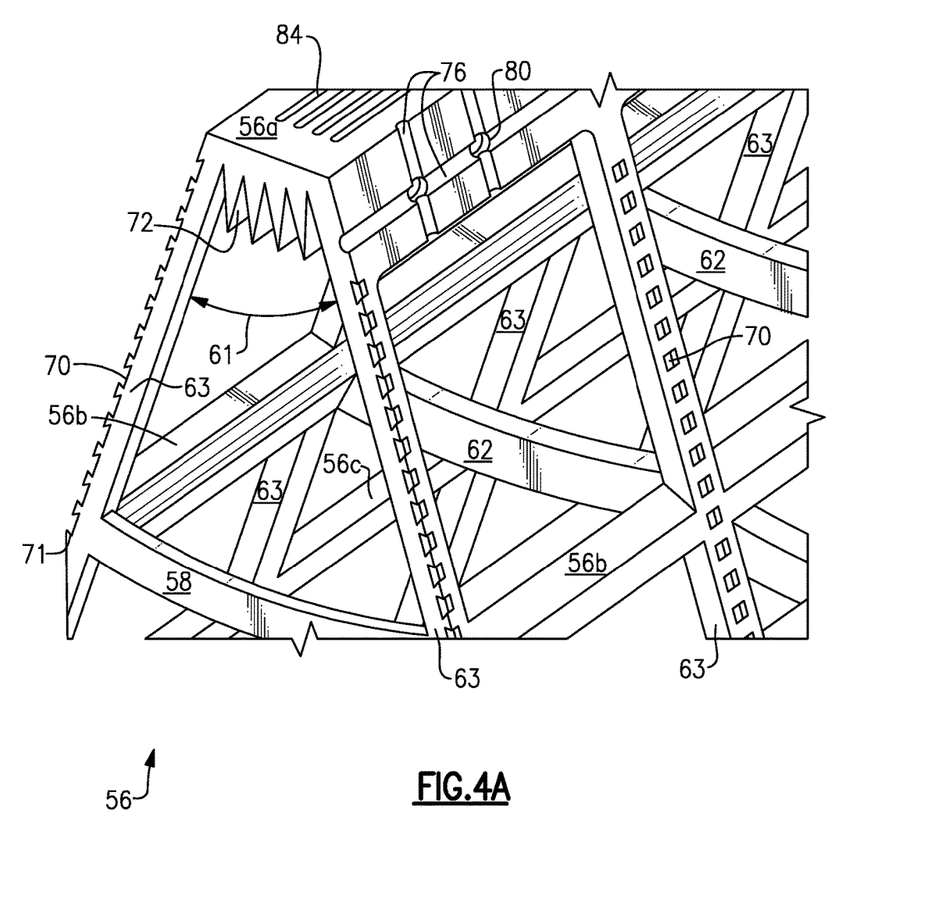
FIG. 4A is an enlarged view of a rigid structure.

As shown in FIGS. 2C, 3, and 4A, the rigid structures 56 are pie shaped in that they have a generally triangular shape except for one arcuate side. The pie shape defines an inner corner 61. The rigid structures 56 include legs 63 that extend in a radial direction and ribs 58, 59, 62 that extend in a circumferential direction between adjacent legs 63. There are innermost ribs 58, middle ribs 59, and outermost ribs 62. Wrapped around at least a portion of each of the rigid structures 56 is porous capillary media 64 constructed from porous media. Because the porous capillary media 64 is wrapped around portions of rigid structures 56, a shape of the porous capillary media 64 is defined by a shape of the rigid structures 56. In the embodiment shown, the porous capillary media 64 are supported in a group of pie shapes because of the pie shaped rigid structures 56.

In one embodiment, the porous capillary media 64 is formed of multilayer screen mesh, felt, sintered metallic powder, or ceramic. Material for the porous capillary media 64 may be chosen to not be reactive with the refrigerant.

The legs 63 are connected by arms extending in the axial direction. There is an innermost arm 65$a$, inner middle arms 65$b$, outer middle arms 65$c$, and outermost arms 65$d$. In the embodiment shown, the porous capillary media 64 is wrapped around the innermost arm 65$a$ and the outer middle arms 65$c$. Thus, porous capillary media 64 enclose the inner middle arms 65$b$, but not the outermost arms 65$d$. In another embodiment, the porous capillary media are wrapped around the inner middle arms 65$b$ and innermost arm 65$a$ only. Because there is a single innermost arm 65$a$ forming a point, the porous capillary media 64 will have a portion near the outlet tube 60 with an angle equal to an angle of the inner corner 61.

Faces of the ribs 58, 59, 62, legs 63, and arms 65 of the rigid structure 56 in connection with the porous capillary media 64 form an absorbent system spanning an interior of the reservoir 54. A drop of liquid anywhere in the reservoir 54 should be close to one of the ribs 58, 59, 62, legs 63, arms 65, or porous capillary media 64. Thus, liquid floating in the reservoir 54 will likely come into contact with the rigid structure 56 or the porous capillary media 64 without any outside excitation.

Because the porous capillary media 64 is wrapped on the rigid structure 56, the porous capillary media 64 can maintain a desired shape even if it is flexible or lacks rigidity. The rigid structures 56 provide support for the porous capillary media 64.

One consideration in designing an arrangement of the rigid structures 56 is a contact angle of the liquid refrigerant and an angle of the inner corner 61 of the rigid structures 56 defined by the legs 63. The rigid structure 56 will collect refrigerant if the sum of the liquid refrigerant's contact angle plus half of the angle defined by the inner corner is less than 90°. For example, if the refrigerant is water, and the contact angle of water is 70°, the rigid structure 56 will collect liquid refrigerant if the angle A of the inner corner 61 is less than 40°. Angle A is defined by an extension of legs 63. Liquids with smaller contact angles would attach to rigid structures 56 a greater angle at inner corner 61. Thus, the reservoir 54 could be formed with relatively fewer rigid structures 56. In the illustrated embodiment, the angle of the inner corner 61 is 36°.

A contact angle of a liquid varies depending on the surface the liquid is in contact with. Contact angles between many common liquids and surfaces are readily available in technical literature and would be known to a skilled person. Where angles between particular liquids and surfaces are not known or documented in readily available resources, they may be measured by known methods.

FIG. 4A is an enlarged view of a portion of the rigid structure 56 with the porous capillary media 64 removed. Pocket ladders 70 on edges of the legs 63 collect liquid and facilitate fluid movement in a radial direction. The pockets 70 on the left hand side legs 63 are shown cut in half.

Figure 4B:
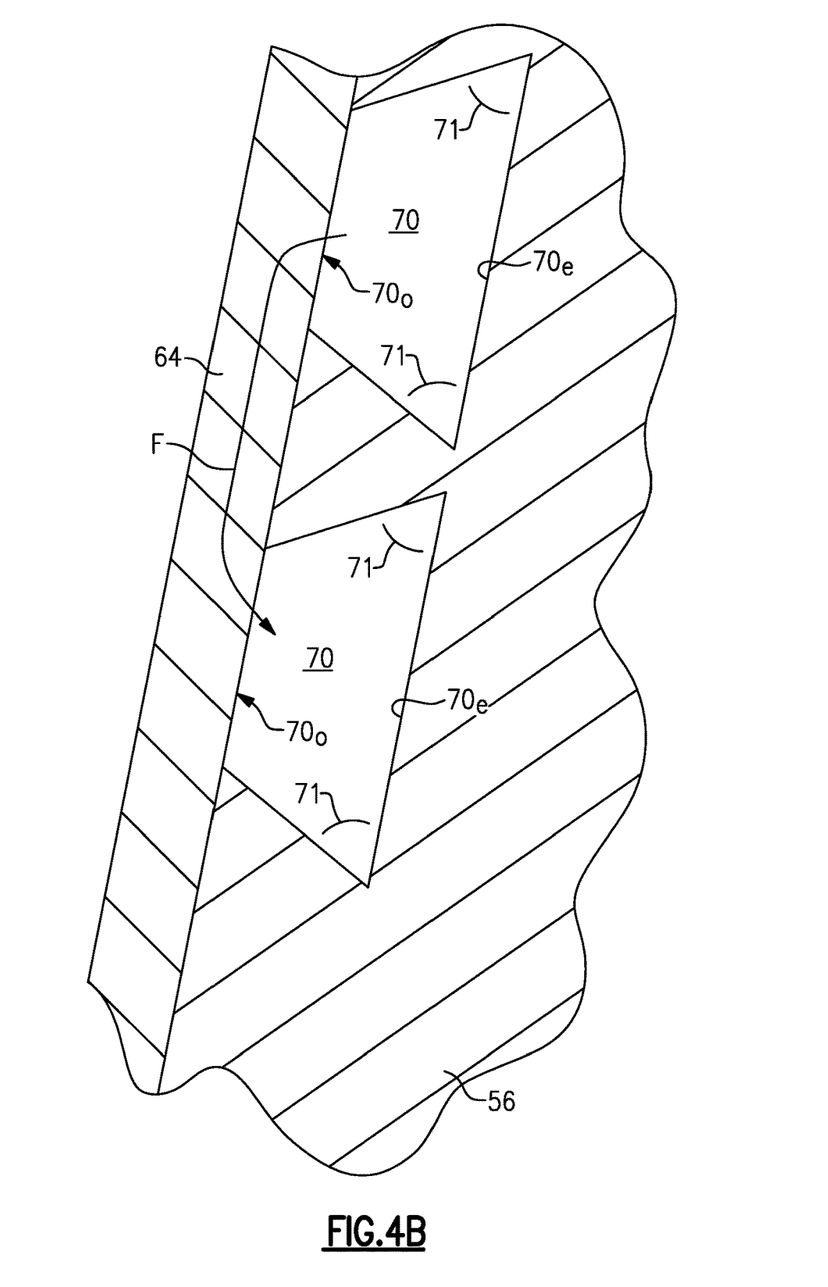
FIG. 4B is an enlarged view of a pocket in the rigid structure.

An exemplary pocket 70 is depicted in a further enlarged view in FIG. 4B. The pockets 70 are shaped to facilitate fluid movement radially inwardly along legs 63. The pockets 70 are wider at an end 70e spaced away from their relatively narrow openings 70o. In the disclosed example, they have a trapezoidal cross-sectional shape. Further, angles 71 are acute to collect refrigerant. The pockets 70 hold a greater quantity of liquid, and with a greater force, than a flat surface with square edges would. Because the pockets 70 are near each other, liquid will climb from overflowing pockets 70 to adjacent, relatively empty pockets 70 through porous capillary media 64. This is shown schematically at F. In this way, the pockets 70 move liquid radially along the rigid structures 56 even in the presence of adverse external forces, such as gravity.

Figure 4C:
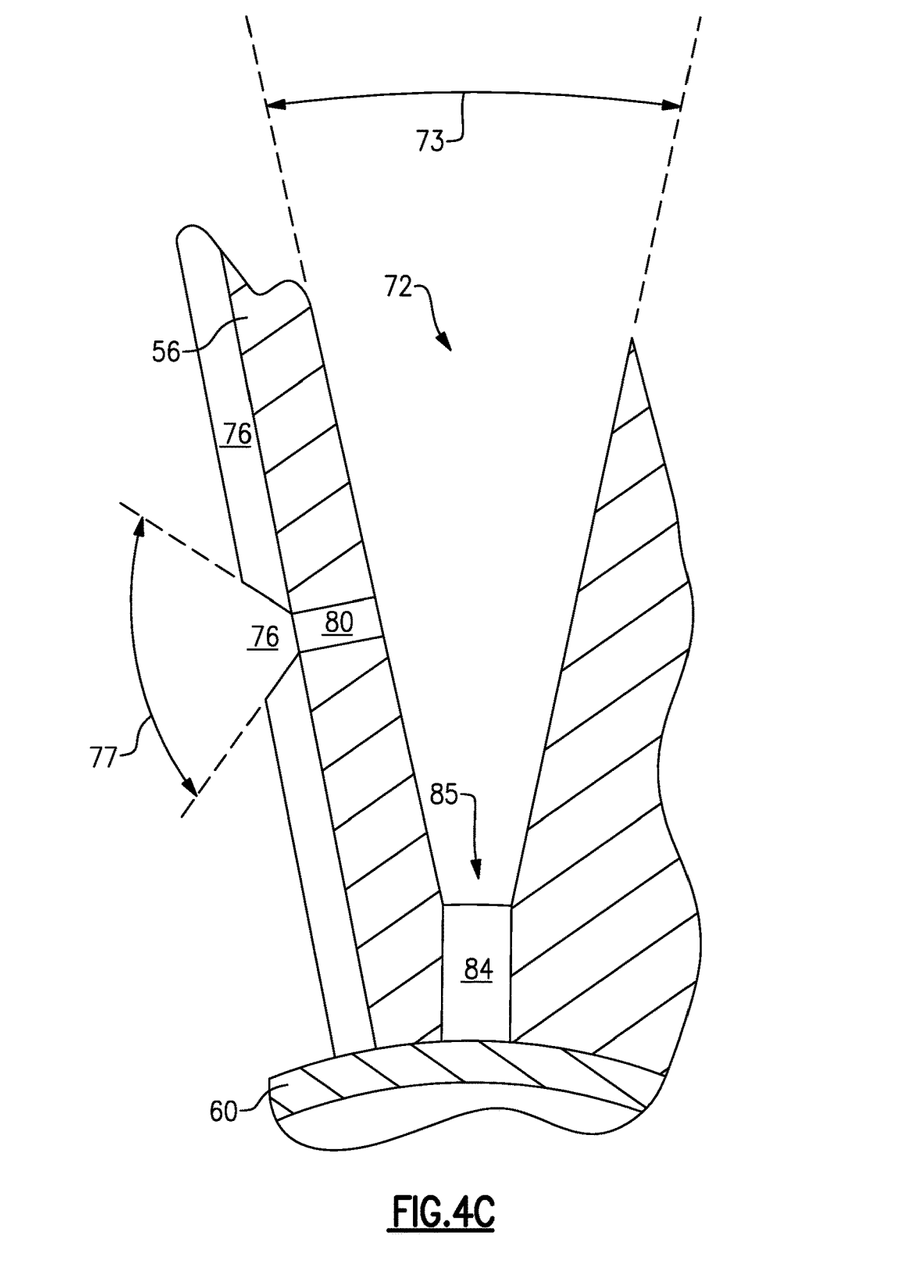
FIG. 4C is an enlarged view of a corner groove in the rigid structure.

Corner grooves 72, side grooves 76, holes 80, and holes 84, shown in another enlarged view in FIG. 4C facilitate fluid movement toward the outlet tube 60. The side grooves 76 are in fluid communication with the corner grooves 72 through holes 80. Each corner groove 72 feeds into a hole 84 that is aligned with a trough 85 of the corner groove 72. The holes 84 communicate liquid collected in the corner grooves 72 to the porous tube of the outlet tube 60.

Angles 73 defined by the corner grooves 72 and angles 77 defined by the side grooves 76 affect the grooves' 72, 76 efficacy in collecting refrigerant in a liquid state in the same manner as described above with respect to the angle A at inner corner 61 and the rigid structures 56. To collect refrigerant in a liquid state, the grooves 72, 76 may have acute angles and be constructed such that the sum of a liquid refrigerant contact angle, plus half of the angle 73, 77 defined by the grooves 72, 76 is less than 90°. Phrased another way, if half of either angle 73 or 77 is subtracted from 90°, the difference may be greater than the contact angle of the liquid refrigerant. For example, if the liquid refrigerant is water with a contact angle of 70°, the difference between 90° and the contact angle of the refrigerant is 20°. If the difference is 20°, the angles 73, 77 should each be less than 40°, because 20° is half of 40°. In one embodiment, the angles 73, 77 are 36°.

The rigid structures 56 and porous capillary media 64 work together to create a flow of liquid to the outlet tube 60. As liquid near the outlet tube 60 is drawn into the outlet tube 60, and out of the reservoir 54, the continuous flow will drive liquid collected elsewhere on the rigid structure 56 toward the outlet tube 60. The flow of liquid from the outlet tube 60 is accomplished without requiring any external power to excite the liquid.

The disclosed structure will result in the great bulk of refrigerant leaving the output tube 60 to be refrigerant in a liquid form.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A passive liquid collecting device, comprising:
   a reservoir including an outlet;
   multiple rigid structures disposed within the reservoir and configured to collect a liquid and direct the liquid to the outlet;
   porous capillary media supported by the multiple rigid structures;
   wherein the multiple rigid structures are arranged circumferentially around a porous tube leading to the outlet; and
   wherein the reservoir has a cylindrical shape, and a leg portion of at least one of the multiple rigid structures extends along a circular cross-section of the reservoir in a direction that is radial relative to the circular cross-section.

2. The passive liquid collecting device of claim 1, wherein the porous capillary media is wrapped around at least a portion of each of the multiple rigid structures.

3. The passive liquid collecting device of claim 1, wherein the liquid is a refrigerant.

4. The passive liquid collecting device of claim 1, wherein the reservoir is configured for use in a microgravity environment.

5. The passive liquid collecting device of claim 1, wherein the porous capillary media include at least one of a multilayer screen mesh, a felt, a sintered metallic powder, and a ceramic material.

6. The passive liquid collecting device of claim 1, wherein the multiple rigid structures are arranged across 360° around the tube.

7. The passive liquid collecting device of claim 1, wherein the multiple rigid structures are arranged across less than 360° around the tube, leaving spaces where refrigerant may enter the reservoir.

8. The passive liquid collecting device of claim 1, wherein the liquid has a contact angle, the multiple rigid structures have a corner with a corner angle, and the sum of the contact angle and half of the corner angle is less than 90°.

9. The passive liquid collecting device of claim 1, wherein the leg portion includes a plurality of pockets in a linear arrangement configured to facilitate liquid motion in the radial direction.

10. The passive liquid collecting device of claim 9, wherein the porous capillary media overlies the pockets to assist in liquid flow.

11. The passive liquid collecting device of claim 1, wherein at least one of the multiple rigid structures includes grooves at an inner corner defining an acute angle forming a trough and each trough is aligned with a hole that is in fluid communication with the outlet.

12. The passive liquid collecting device of claim 1, wherein at least one of the multiple rigid structures includes side grooves defining acute angles.

13. The passive liquid collecting device of claim 12, wherein the at least one of the multiple rigid structures includes corner grooves with acute angles, and the side grooves have holes in fluid communication with the corner grooves, and the corner grooves have holes in fluid communication with the outlet.

14. A thermal control loop, comprising:
an evaporator in communication with a heat source; and
an accumulator located downstream of the evaporator, the accumulator including:
  a reservoir including an outlet;
  multiple rigid structures disposed within the reservoir and configured to collect a liquid and direct the liquid to the outlet;
  porous capillary media supported by the multiple rigid structures;
  wherein the multiple rigid structures are arranged circumferentially around a porous tube leading to the outlet; and
  wherein the reservoir has a cylindrical shape, and a leg portion of at least one of the multiple rigid structures extends along a circular cross-section of the reservoir in a direction that is radial relative to the circular cross-section.

15. The thermal control loop of claim 14, wherein the multiple rigid structures each have a pie shape and each of the multiple rigid structures are arranged circumferentially around a tube leading to the outlet.

16. The thermal control loop of claim 15, wherein the multiple rigid structures are arranged across 360° around the tube.

17. The thermal control loop of claim 15, wherein the multiple rigid structures are arranged across less than 360° around the tube, leaving spaces where refrigerant may enter the reservoir.

* * * * *